May 8, 1956  A. H. HOWES  2,744,733
HEAT EXCHANGE APPARATUS
Filed May 29, 1952  2 Sheets-Sheet 1

INVENTOR.
ALLEN H. HOWES
BY
ATTORNEY

May 8, 1956  A. H. HOWES  2,744,733
HEAT EXCHANGE APPARATUS
Filed May 29, 1952  2 Sheets-Sheet 2

INVENTOR.
ALLEN H. HOWES
BY
ATTORNEY

//  
2,744,733
HEAT EXCHANGE APPARATUS

Allen H. Howes, New Rochelle, N. Y., assignor to Foster Wheeler Corporation, New York, N. Y., a corporation of New York Application May 29, 1952, Serial No. 290,626

6 Claims. (Cl. 257—224)

This invention relates to heat exchange apparatus and more particularly pertains to apparatus for heating one fluid by passing it in indirect heat exchange relationship with another fluid.

The invention when applied to the generation of vapor provides an air heater in which gases of combustion leaving said apparatus are reduced to a low exit temperature while metal temperatures in the air heater are maintained sufficiently high to prevent condensation and subsequent corrosion.

In the conventional air heater for a vapor generator, when the gas temperature in at least a portion of said heater approaches the dew point temperature, because the heat exchange surfaces are necessarily cooler, the moisture carried in the gas are caused to condense on said surfaces, thereby causing corrosion of the air heater.

The present invention provides a main gas conduit through which heated gases flow to a heated gas outlet conduit. The gases in flowing to the outlet conduit pass through one section of a heat exchanger in indirect heat exchange relationship with a gas to be heated, for example, with air. A heated gas bypass conduit communicates with the main gas conduit at a point to receive a controlled portion of the heated gases prior to flow thereof through the heat exchanger, and discharges said gases into another section of the heat exchanger. Gases to be heated are introduced into the heat exchanger in indirect heat exchange relationship with heated gases from the bypass conduit in said other section of the heat exchanger and thereafter in indirect heat exchange relationship with heated gases from the main conduit in the first-mentioned section of the heat exchanger prior to flowing to a point of use. Gases from the bypass conduit, after flowing in indirect heat exchange relationship in said other section of the heat exchanger with gases to be heated, are discharged into the outlet conduit at a point beyond the first section of the heat exchanger in the direction of flow of gases in the main conduit.

In apparatus of the present invention, gases at their highest temperature pass, in a parallel thermal flow section, in heat exchange relationship with air or other gases at their lowest temperature in a parallel thermal flow, that is, a flow in which the gases at their highest temperature pass in indirect heat exchange relationship with air or other gases at their lowest temperature and gases at their lowest temperature flow in indirect heat exchange relationship with air when the air is at its highest temperature. Also, in a counterflow section of said apparatus, heated air from the parallel flow section first passes in indirect heat exchange relationship with gases of lowest temperature and thereafter passes in said counterflow section counter-current to and in indirect heat exchange relationship with gases of increasingly higher temperature.

With the apparatus of the present invention condensation and accompanying corrosion is prevented because the air flowing into the parallel flow heating section first passes in heat exchange relationship with gases at their highest temperature and is thereby heated, the preheated air thereafter entering the counterflow heater section. Thusly, the metal temperature of both sections of the heat exchanger is maintained at a higher degree than the dew point temperature and no corrosion will, therefore, take place in either section. The apparatus of the present invention, therefore, has the advantage of requiring but a low investment in heating surface due to the high effectiveness of the counterflow section thereof while at the same time gaining corrosion protection for the apparatus due to the parallel flow section.

The invention, together with its various features and objects, will be best understood by reference to the accompanying drawings in which.

Like characters of reference refer to the same or similar parts throughout the several views.

Figure 1:
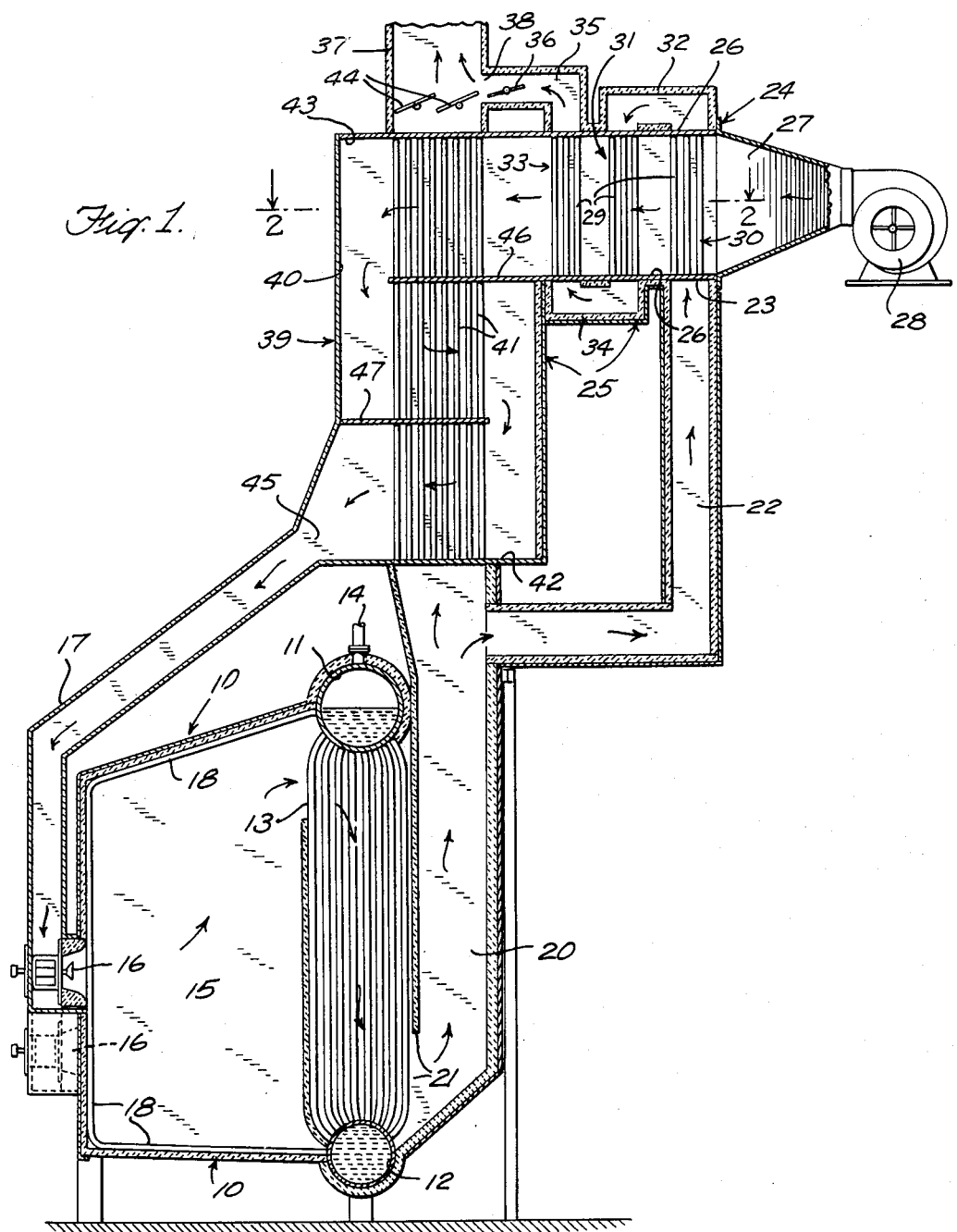
Fig. 1 is a diagrammatic view of the heat exchanger of the present invention as applied to a vapor generator and used as air heating apparatus for said generator.

Referring to the drawings, Fig. 1 wherein the heat exchanger of the present invention is illustrated as used for heating air for supporting combustion in the furnace of a vapor generator, the reference numeral 10 designates the setting of a vapor generator having vapor-generating apparatus therein which comprises an upper steam and water drum 11 and a lower water drum 12. The drums are connected by a bank of vapor-generating tubes 13. Saturated steam from drum 11 is conducted to a superheater through saturated steam outlet conduit 14 and, from the superheater to power-consuming apparatus, not shown. At one side of the bank of tubes 13 is a furnace chamber 15 fired by firing means comprising a plurality of burners 16 having a heated air supply conduit 17. The roof, floor and side wall of chamber 15 are lined with water tubes 18.

At the opposite side of tube bank 13 is a gas outlet passage 20 having a gas inlet 21 in communication with the vapor generator to receive gases of combustion therefrom after the gases have passed over tube bank 13.

A bypass gas conduit 22 communicates with the upper portion of conduit 20 and receives some of the gases therefrom. Bypass conduit 22 extends substantially horizontally from conduit 20 thence vertically upwardly where it communicates with gas inlet 23 of a parallel flow section 24 of air heater 25. As shown, section 24 of air heater 25 comprises a horizontally extending air conduit 26 having an air inlet 27 which receives air to be heated from a blower 28. The heater section 24 comprises laterally spaced groups of vertically extending tubes, the tubes in each group also being laterally spaced from one another. Each group of tubes provides a gas path for gases flowing from bypass conduit 22, the groups being so connected as to provide a continuous flow path transversely of the air conduit 24 for said gases. As illustrated in the drawings, gases from bypass conduit 22 enter group 30 of tubes 29 (at the right of Figs. 1 to 3) through gas inlet 23. Group 30 of tubes 29 communicates with the next group 31 of tubes 29, in the direction of flow of air in conduit 26, through upper interconnecting conduit 32 while group 31 of tubes 29 communicates with the next group 33 of tubes 29 through lower interconnecting conduit 34. Group 33 discharges gases into passage 35 which passage, as shown, is damper controlled by damper 36 and communicates with stack 37 through gas discharge outlet 38.

Parallel flow heater section 24 receives hot gases from bypass conduit 22 and incoming cold air from air inlet 27, the gases and air flowing in the same or parallel direction, that is, as illustrated in the drawing, from right to left in heater section 24, passing in indirect heat exchange relationship with one another. The gases flow in tubes 29 from inlet 23 through group 30, thence through upper interconnecting conduit 32 into group 31 and from group 31 into lower interconnecting conduit 34 through group 33. From group 33, gases flow to stack 37 through damper controlled passage 35 and gas discharge outlet 38. Air passes through conduit 26, from air inlet 27, from the right of conduit 26 to the left flowing consecutively transversely of groups 30, 31 and 33.

Air conduit 26 of parallel flow section 24 of the air heater of the present invention communicates at the left hand end of said section with a vertically extending counterflow air heating section 39 at the upper part of section 39. Air heating section 39 comprises air conduit 40 which extends vertically downwardly from conduit 26 toward setting 10, said conduit 40 receiving heated air adjacent the top thereof from section 24. A group of vertically extending tubular members 41 are disposed in the central portion of conduit 40 and communicate at the lower ends thereof, through end wall 42 of conduit 40, with gas conduit 20 above the inlet to bypass 22. The upper ends of tubular members 41 communicate, through end wall 43 of conduit 40, with stack 37 at a point below gas outlet 38. Flow of gases through tubular members 41 from gas conduit 20 to stack 37 is controlled by dampers 44. Air received by conduit 40 from air conduit 26 is directed transversely of tubular members 41 as it flows downwardly to heated air outlet 45 by horizontal baffles 46 and 47 which baffles are in vertically spaced relationship to one another. Heated air outlet 45 is in communication with heated air supply conduit 17.

In operation, hot gases of combustion after passing in heat exchange relationship with tube banks 13 leave vapor generator furnace 15, passing into gas outlet conduit 20 through inlet 21. A portion of the gases flowing in gas conduit 20 enters bypass 22 to pass through parallel flow section 24 while the remaining portion passes into tubular members 41 of counterflow section 39 of the air heater, the proportion of the gases flowing through sections 24 and 39 being controlled by the positioning of dampers 36 and 44.

The portion of the gases flowing through bypass 22 pass into group 30 of tubes 29 and thereafter serially flow through groups 31 and 33 of said tubes, as hereinabove described, to enter stack 38 through damper controlled passage 35 and gas outlet 38.

The remaining portion of gases from passage 20 enters tubular members 41 of counterflow section 39 and pass upwardly in said tubes to flow into stack 37 said flow being controlled by dampers 44.

Air to be heated from blower 28 flows into parallel flow section 24 through inlet 27 thereafter passing transversely of groups 30, 31 and 33 of tubes 29 thereby becoming heated. Heated air, after passing over group 33, enters conduit 40 of counterflow section 39 passing transversely of tubular members 41 as directed by baffles 46 and 47 as the air flows downwardly to heater air outlet 45. The downwardly flowing air passes countercurrent to and in indirect heat exchange relationship with gases flowing upwardly in tubular members 41. Heated air from conduit 40 flows to burners 16 through heated air supply conduit 17.

Figure 2:
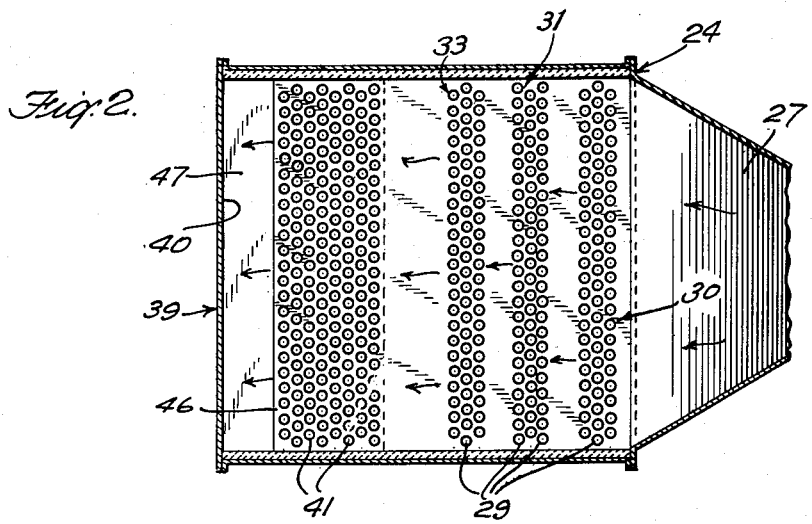
Fig. 2 is a plan view taken on the line 2—2 of Fig. 1.
Figure 3:
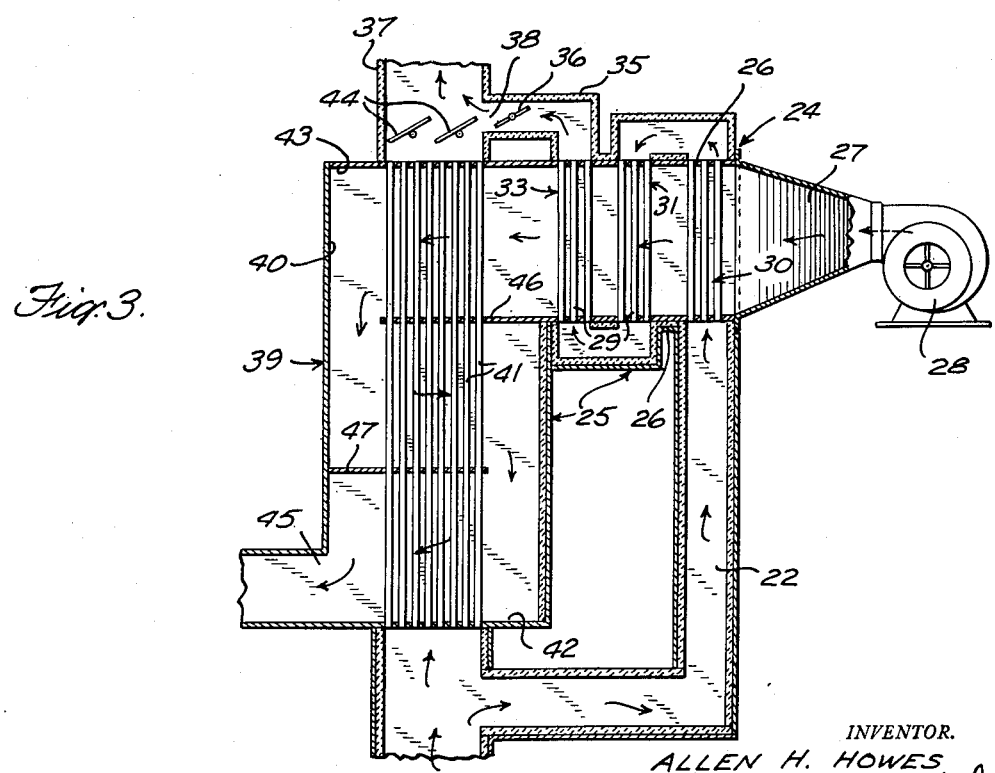
Fig. 3 is a view similar to Fig. 1 but illustrating the apparatus of the present invention used broadly as a heat exchanger for exchanging heat between heated gases and gases to be heated.

The embodiment of the invention illustrated in Fig. 3 is similar to that shown in Figs. 1 and 2 except that the heat exchanger of the present invention is not illustrated in conjunction with a vapor generator. A gas to be heated is introduced into inlet 27 of parallel section 24 through inlet 27 and flows through the heat exchanger as hereinabove described in the description of the operation of the embodiment of the invention illustrated in Figs. 1 and 2 while heating gases flow through parallel flow section 24 and counterflow section 29 as also hereinabove described.

It will be understood that changes may be made in the form, location and arrangement of the several parts of the apparatus illustrated, without departing from the principles of the invention. The invention is not to be limited excepting by the scope of the appended claims.

What is claimed is:

1. A heat exchanger for exchanging heat between fluids from a source of heating fluid and a source of fluid to be heated, said heat exchanger comprising at least two sections connected for providing a fluid path for the fluid to be heated in series, a first section having a first inlet connected to the source of fluid to be heated and having a first outlet for discharging the fluid to be heated from said first section, a second section having a second inlet connected to said first outlet of said first section to receive fluid to be heated from said first section after passage through the entire first section and having a second outlet for discharging said fluid to be heated from said second section after passage of the fluid to be heated through the latter, heat transfer means in said first and said second sections for conducting heating fluid through their respective sections in heat exchange relationship with said fluid to be heated, the heat transfer means in said first section having an initial portion thereof through which heating fluid first passes in said first section and arranged in the latter in the path of flow of the fluid to be heated as it initially enters the first section through said first inlet, said heat transfer means in said first section having a third inlet communicating with said source of heating fluid and with said initial portion, said heat transfer means in said first section having a third outlet for discharging the heating fluid after passage through the entire heat transfer means of said first section, the heat transfer means in said second section having an initial portion thereof through which heating fluid first passes in said second section and arranged in the latter in the path of flow of the fluid to be heated before the latter fluid is discharged from said second section through said second outlet, said heat transfer means in said second section having a fourth inlet communicating with said source of heating fluid and with the last-mentioned initial portion, and the last-mentioned heat transfer means having a fourth outlet for discharging heating fluid therefrom.

2. The heat exchanger of claim 1 wherein the heat transfer means of said first section has a final portion thereof in communication with said third outlet and through which final portion the heating fluid is discharged from said first section and said heat exchanger, said final portion being arranged in the path of flow of the fluid to be heated where the latter leaves the first section, and wherein said heat transfer means of said second section has a final portion thereof in communication with the fourth outlet of the heat transfer means of said second section and through which final portion the heating fluid is discharged from said second section and said heat exchanger, the last-mentioned final portion being arranged in the path of flow of the fluid to be heated as the latter enters the second section.

3. The heat exchanger of claim 1 wherein control means are provided for regulating the flow of heating fluid through the heat transfer means of said first and said second sections to proportion the flow of heating fluid in the respective sections.

4. The heat exchanger of claim 1 wherein the heat transfer means comprises tubular members through which the heating fluid flows and the tubular members of the heat transfer means in said first section are connected to cause flow of the heating fluid in a generally parallel direction with respect to the flow of fluid to be heated in said first section, and the tubular members of the heat transfer means in said second section are connected to cause flow of the heating fluid countercurrent with respect to the flow of fluid to be heated in said second section.

5. The heat exchanger of claim 4 wherein the total surface area of the tubular members in said second section is larger than that of the tubular members in said first section.

6. An air heater comprising at least two sections connected for providing a flow path for air to be heated in series, a first section having a first inlet connected to receive air to be heated and a first outlet for discharging the air from said first section, a second section having a second inlet connected to said first outlet of said first section to receive air from the latter after passage through the entire first section and a second outlet for discharging said air to be heated from said second section after passage through the entire second section, first heat transfer means in said first section disposed in heat exchange relationship with air to be heated flowing through said first section, second heat transfer means positioned in said second section in heat exchange relationship with air to be heated flowing through said second section, said first-mentioned heat transfer means having an initial portion thereof through which high temperature heating gases first pass in said first section and arranged in the latter in the path of flow of the air to be heated as it initially enters the first section through said first inlet, said first heat transfer means having a third inlet communicating with a source of high temperature heating gases and with said initial portion, said first heat transfer means having a third outlet for discharging heating gases from said first section after passing in heat exchange relationship with the air to be heated therein, said second heat transfer means having an initial portion thereof through which high temperature heating gases pass in said second section and arranged in the latter in the path of flow of the air to be heated as it leaves said second section through said second outlet, said second heat transfer means having a fourth inlet communicating with said last-mentioned initial portion and connected to said source of heating gases, and said second heat transfer means having a fourth outlet for discharging the heating gases from said second section after passing in heat exchange relationship with the air to be heated therein.

References Cited in the file of this patent

UNITED STATES PATENTS

| | | |
|---|---|---|
| 1,641,999 | Webster | Sept. 13, 1927 |
| 1,835,309 | Kemnal | Dec. 8, 1931 |
| 2,167,596 | Vial | July 25, 1939 |
| 2,357,300 | Bailey | Sept. 5, 1944 |
| 2,386,188 | Artsay | Oct. 9, 1945 |
| 2,415,123 | Zoller | Feb. 4, 1947 |
| 2,511,647 | Marshall | June 13, 1950 |
| 2,578,783 | Cruise | Dec. 18, 1951 |
| 2,582,830 | Hawley | Jan. 15, 1952 |
| 2,594,471 | Marshall | Apr 29, 1952 |

FOREIGN PATENTS

| | | |
|---|---|---|
| 18,510 | Netherlands | Aug. 15, 1928 |